Patented Nov. 6, 1951

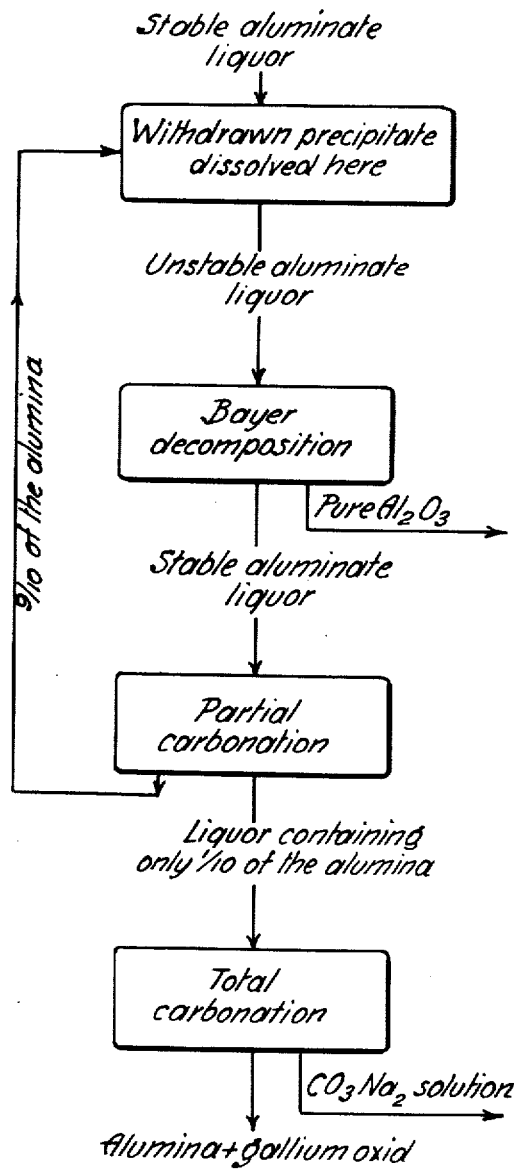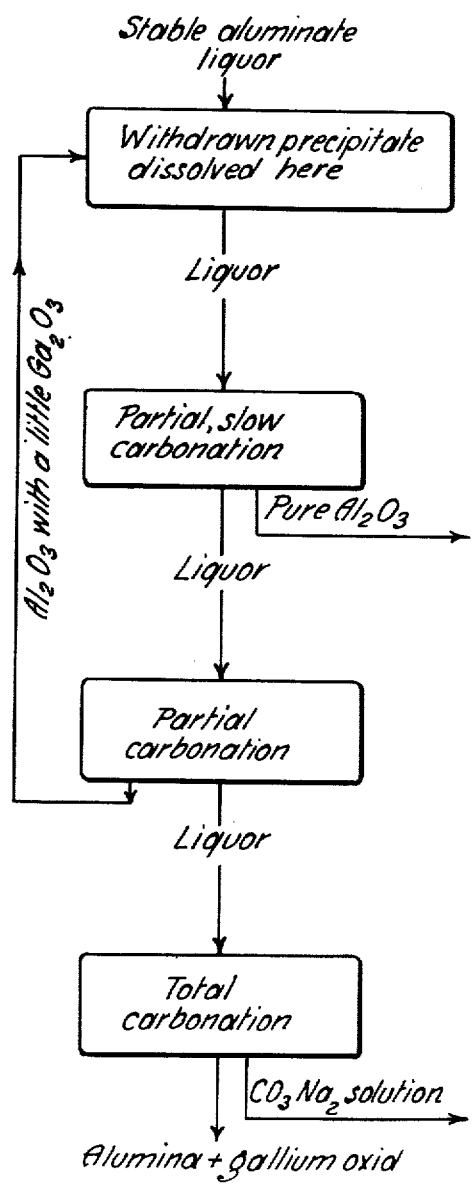

2,574,008

UNITED STATES PATENT OFFICE 2,574,008

METHOD OF EXTRACTING GALLIUM OXIDE FROM ALUMINOUS SUBSTANCES

Maurice Beja, Paris, France, assignor to Pechiney Compagnie de Produits Chimiques et Electrometallurgiques, Paris, France, a corporation of the French Republic Application December 20, 1947, Serial No. 792,947
In France December 30, 1946

11 Claims. (Cl. 23—140)

The object of this invention is to separate and recover gallium from aluminous materials wherein gallium is present in very small quantities.

Aluminum ores invariably contain small quantities of gallium. In French bauxite, for example, there are about 0.02 to 0.05 parts of $Ga_2O_3$ for every 100 parts of $Al_2O_3$. Industrially, alumina is generally obtained from bauxite by a method known as the "Bayer Process for the Purification of Bauxite," or simply the "Bayer Decomposition." In that process, the ore is first digested with a solution of caustic soda; and after the insoluble impurities have been removed from the liquor, the latter is seeded with aluminum hydroxid crystals as a primer to precipitate and recover about 60% of its aluminum content as substantially pure aluminum hydroxid. By using the decomposed aluminate liquor left after removing the precipitate, to digest more of the ore and repeating the aforesaid steps, the operation may be continuous or cyclic as generally practiced in Bayer plants.

Since the decomposed aluminate liquor in a Bayer plant contains relatively small amounts of sodium gallate, that liquor may be used as a source material for the recovery of gallium by treating it by the method of the present invention. The latter is based upon the fact that alumina and gallium oxid are both amphoteric with the gallium oxid slightly the more acidic, wherefore, as I have found, the very slight difference in their behaviour due to this may be utilized to effect the separation of the greater part of the gallium oxid from the alumina. It is to be understood that the decomposed liquors in a Bayer plant are not the only source of material which may be treated by this invention; for any similar liquor containing $Ga_2O_3$ and $Al_2O_3$ is, of course, susceptible to this treatment, as well as any fresh liquors derived by dissolving aluminous substances in an alkaline solution.

To illustrate, by way of example, suitable procedures for practicing the present invention, Flow Sheets 1 and 2 have been provided in the accompanying drawings.

In describing this invention, it will be assumed, for example, that the starting or source material is an aluminous substance such as bauxite, and that the latter is first digested with a caustic soda solution to dissolve its alumina and gallium oxid content. After removing any insoluble impurities from the liquor (which, as in the Bayer Process, now comprises a caustic solution of sodium aluminate and sodium gallate) the liquor, may be treated to slowly precipitate a portion of its sodium aluminate as substantially pure aluminum hydroxid which is then removed from the remainder of the decomposed liquor. During this slow precipitation of aluminum hydroxid, the sodium gallate remains dissolved in the liquor until toward the end of this operation, whereupon, and after removing the precipitate, all the gallate is precipitated as gallium hydroxid together with the last fraction of the aluminate. By proceeding in this way, it is possible to obtain, for this final precipitation, an aluminate liquor relatively high in concentration of sodium gallate as compared with its concentration in the initial caustic solution. By slow precipitation, wherever referred to herein, is meant a precipitation of the order of that in the Bayer Process whereby substantially pure aluminum hydroxid is thrown down and the sodium gallate left substantially undisturbed in the liquor. Such a result, as will be readily understood, cannot be attained unless the liquor is treated very slowly and gradually.

The aforesaid precipitation of the substantially pure aluminum hydroxid from the aluminate liquor may be effected in different ways, but preferably by neutralizing slowly the excess $Na_2O$ of the liquor by the gradual addition thereto of an acid. For this purpose carbonic acid gas may be caused to bubble slowly through the liquor. While carbonic acid is preferred, any acid whatever may be used for this purpose. Another way of precipitating substantially pure aluminum hydroxid from the aluminate liquor is to subject the liquor to spontaneous decomposition in the presence of an alumina primer, such as crystals or seeds of aluminum hydroxid. In fact, if the liquor is unstable at the temperature of processing, a slow hydrolysis will normally occur accompanied by the precipitation of aluminum hydroxide. Such instability depends upon the ratio of $Na_2O$ to $Al_2O_3$ in the aluminate liquor and also upon its concentration; and, as in the case of a Bayer Decomposition, the introduction of an alumina primer into an unstable aluminate liquor promotes hydrolysis.

While the precipitate produced in a Bayer Decomposition contains very little gallium, the Bayer Process, as generally practiced under industrial conditions, does not permit the separation and recovery from the liquor of more than 60% of its aluminum content, since, when this 60% has been removed, the liquor is very stable and therefore retains the remaining 40% in solution despite the presence of a primer. Thus, in a Bayer Decomposition the ratio of $Ga_2O_3$ to $Al_2O_3$ in the decomposed aluminate liquor after a single Bayer cycle is only about 2.5 times its ratio in the ore treated. However, since in the Bayer Process when operated continuously, the stable decomposed aluminate liquor is returned to react with a fresh quantity of the ore (the addition of which makes the liquor unstable again), the repeated recycling of the liquor builds up said ratio until in the long run it becomes stabilized at about 15 to 20 times the ratio of $Ga_2O_3$ to $Al_2O_3$ in the ore treated. Consequently, these cycled aluminate liquors of the Bayer Process constitute an excellent raw material for the recovery of gallium in accordance with the present invention; for by taking these stable liquors, in which the ratio of $Ga_2O_3$ to $Al_2O_3$ may already have been increased to 15 or 20 times their ratio in the ore, and slowly treating them with an acid, as previously explained, the molecular ratio of $Na_2O$ to $Al_2O_3$ will be lowered sufficiently to make them unstable and thereby bring about further decomposition by hydrolysis and hence further precipitation of pure aluminum hydroxid. Thus by continued or repeated slow neutralization of the $Na_2O$, the concentration of $Ga_2O_3$ in these liquors may be increased to many times its concentration in a Bayer plant, before recovering the $Ga_2O_3$ as aforesaid with the last fraction of the alumina.

The following examples are illustrative of the procedural steps which may be used in practicing the invention.

Example 1

It will be assumed that, by reacting an aluminous substance with caustic soda, an aluminate solution or liquor has been obtained containing 100 gm. $Na_2O$ per liter and having the following relative molecular composition:

10 $Al_2O_3$ for 20 $Na_2O$

This liquor is unstable that is, at the concentration and temperature specified, the ratio of $Al_2O_3$ to $Na_2O$ in the solution is higher than that required to bring the $Al_2O_3$ into equilibrium with the $Na_2O$; so that, by a single Bayer Decomposition which is now effected at a temperature between 30 and 40° C. and the removal of the alumina which precipitates, the preceding ratio of $Al_2O_3$ to $Na_2O$ in the liquor will become 4 $Al_2O_3$ for 20 $Na_2O$ that is, a ratio of 1 to 5 at which the liquor is stable since at this ratio the $Al_2O_3$ and $Na_2O$ are close to being in equilibrium at the concentration and temperature specified. The liquor is now slowly and partially carbonated by bubbling $CO_2$ gas through it until the ratio becomes 4 $Al_2O_3$ for 5 $Na_2O$ that is, a ratio of 4 to 5 at which the liquor is unstable again so that a further Bayer Decomposition may be used to precipitate and remove additional alumina from the liquor and reduce the ratio to $Al_2O_3$ for 5 $Na_2O$ that is, a ratio of 1 to 5 again where the liquor, after the removal of the precipitate, is once more stable but contains only $\frac{1}{5}$ of its original alumina together with all or substantially all of its original $Ga_2O_3$. The liquor is now treated with $CO_2$ gas again, but this time rapidly and sufficiently to precipitate all its remaining alumina together with all of its $Ga_2O_3$. In this final precipitate, which, as will be noted, is obtained by complete carbonation of the liquor, the ratio of $Ga_2O_3$ to $Al_2O_3$ is ten times greater than in the original aluminate solution.

If the original aluminate liquor in Example 1 had been taken from the recycled liquors of a Bayer plant, it is obvious that the final precipitate obtained by complete carbonation would have contained 150 to 200 times more $Ga_2O_3$ in relation to its alumina content, than existed in the bauxite treated; wherefore by processing such recycled liquors in accordance with the procedure in Example 1, it is possible to obtain an alumina, at the end of complete carbonation, containing at least 3 parts of $Ga_2O_3$ for every 100 parts of alumina, whereas the bauxite treated contained only 0.02 parts of $Ga_2O_3$ for every 100 parts of alumina.

It will be understood that the terms "stable" and "unstable" wherever they appear in the specification and claims hereof are to be construed as explained above in Example 1, and that the nouns "stability" and "instability" wherever they appear in the specification and claims each denotes respectively the condition defined by the corresponding adjectives "stable" or "unstable" as the case may be.

Example 2

A batch of stable sodium aluminate liquor obtained from a single Bayer Decomposition and having, as in Example 1, the ratio of 4 $Al_2O_3$ to 20 $Na_2O$ (i. e. 1 to 5) is partially carbonated by treatment with $CO_2$ until say about $\frac{1}{5}$ of its alumina is precipitated along with an appreciable quantity of $Ga_2O_3$. This precipitate is removed and dissolved in a fresh batch of the aforesaid aluminate liquor, thus rendering this liquor unstable. This unstable liquor is now subjected to a single Bayer Decomposition to precipitate aluminum hydroxid with a little or no gallium hydroxid, thereby reducing its $Al_2O_3$ to $Na_2O$ ratio to the stable ratio of 1 to 5 or thereabout, and the liquor remaining, after removal of this precipitate, is also subjected to the aforesaid partial carbonation whereby, say $\frac{1}{5}$ of its aluminum content together with a little of its gallium content can be removed and which may be, as in the case before, dissolved in a fresh batch of the stable aluminate liquor; and then the same steps which followed the removal of the first $\frac{1}{5}$ of the alumina, are repeated. By proceeding in this manner, the operation may be continuous or cyclic as illustrated in Flow Sheet 1. The liquor left after each partial carbonation and removal of the precipitate so formed is, as shown in Flow Sheet 1, finally and completely carbonated to remove all its contained $Ga_2O_3$ and remaining alumina together. It will be noted that, in this example, the alumina remaining dissolved in the liquor after each partial carbonation is proportionately about $\frac{1}{5}$ less than that left dissolved in the liquor after the partial carbonation in Example 1.

It is obvious that if, in Example 2, the initial liquor has been taken from the recycled liquors of a Bayer plant instead of, as in the case assumed, from a Bayer liquor which had been subjected to only a single Bayer Decomposition, the $Ga_2O_3$ present in the precipitate obtained at the end by complete carbonation, would have been upwards of 7.5% of the alumina in that precipitate. Moreover, it is possible to obtain an ultimate precipitate still richer in $Ga_2O_3$, by dissolving the 3% $Ga_2O_3$ precipitate obtainable by the procedure of Example 1, or the 7.5% $Ga_2O_3$ precipitate obtainable by the procedure of Example 2, in a caustic soda solution and then treating the resulting liquor in accordance with the procedure of Example 2. In such cases an ultimate precipitate could be obtained containing upwards of 10 parts of $Ga_2O_3$ for every 100 parts of alumina; and since in these cases the alumina removed after each Bayer Decomposition would itself be fairly rich in $Ga_2O_3$, the same should not be discarded but retained and dissolved in that fraction of the decomposed aluminate liquor cycling in the Bayer Process which is intended for a subsequent operation to extract $Ga_2O_3$.

*Example 3*

In this example, as in Example 2, say 1/10 of the alumina, together with an appreciable amount of $Ga_2O_3$, are precipitated from a stable aluminate liquor by a partial carbonation thereof and the precipitate withdrawn and redissolved in a fresh batch of the liquor thereby rendering the latter unstable. But instead of subjecting this unstable liquor to a Bayer Decomposition, as in Example 2, it is subjected to a slow partial carbonation to precipitate substantially pure aluminum hydroxid and then, after this precipitate has been removed, the remaining liquor is subjected to a complete carbonation, as in Example 2. The procedure here may also be continuous or cyclic as illustrated in Flow Sheet 2. Moreover, it will be obvious that in this procedure it may be desirable that a Bayer Decomposition be used to remove substantially pure alumina directly preceding one or more of the partial carbonation steps.

Besides being admirably adapted to the recovery of the gallium content of Bayer liquors, the method of this invention is also particularly suited for the recovery of the gallium oxid contained in the anode metal of aluminum refining tanks where, by the known electrolytic process of the three melted layers, the lighter refined metal forms the upper layer, and the raw metal the lower layer with the electrolyte layer lying between them. During the electrolytic process, part of the aluminum is transferred from anodic layer into cathodic layer and the impurities, including gallium, in the anode metal builds up. When the quantity of impurities contained in the anodic metal has become too high, part of the anodic metal is removed and replaced by commercial aluminum. The anodic metal so withdrawn contains, besides various impurities which are present in small quantities, about 60% of aluminum, 35% of copper and 0.2 to 0.7% of gallium. By reacting this withdrawn anodic metal with caustic soda or with a decomposed aluminate liquor from the cycle of a Bayer plant, all of the aluminum and gallium passes into solution; and after separating and removing the copper and the impurities which have remained insoluble, the clear aluminate liquor may be processed in accordance with the present invention to recover its gallium content.

When aluminous material, either in ore, anodic metal from refining cells, or in other substances, is treated with a caustic soda solution, it may happen that the ratio $Na_2O$ to $Al_2O_3$ in the resulting aluminate liquor is too high to permit a Bayer Decomposition. In such a case the solution, as will be understood, must be first rendered unstable by neutralizing part of the caustic soda with an acid and preferably $CO_2$.

Instead of completely dissolving in caustic soda the alumina from which it is desired to extract the gallium, a smaller quantity of soda may be used and the reaction effected under pressure. Thus, by treating, for example, in an autoclave at about 160° C., 250 gm. of $Al_2O_3$ (in the form of the hydroxid, $Al_2O_3.3H_2O$) with 1 litre of an aluminate solution containing 200 gm. of caustic $Na_2O$ and 120 gm. of $Al_2O_3$ per litre, all the gallium oxid is dissolved from the alumina treated, whereas only about 100 gm. of alumina go into solution. The undissolved 150 gm. of $Al_2O_3$ remain in the form of the hydroxid $Al_2O_3H_2O$ which is practically free from gallium.

The separation or extraction of the gallium content from the aluminum content of the ultimate precipitate obtained by the complete carbonation as aforesaid, may be effected by any suitable known method. For example, that precipitate may be dissolved in an excess of hydrochloric acid, and the gallium content extracted from the solution by means of organic solvents, in particular ether. The gallium chlorid dissolves in the organic solvent, while the alumina remains in the aqueous solution. However, when the ratio of the gallium to aluminum content of the ultimate precipitate is so high as to approach the order of 10 parts of $Ga_2O_3$ to 100 parts of $Al_2O_3$, treatment of the precipitate with an acid, while dissolving all of the $Al_2O_3$, leaves very substantial portions of the $Ga_2O_3$ undissolved by the acid and which therefore remain in the insoluble residue. Such residues have been obtained containing 20 to 30% $Ga_2O_3$. The relatively small quantity of $Ga_2O_3$ which passes into acid solution in any such case can be precipitated by hydrolysis of the solution, if necessary, after rendering it basic.

I claim as my invention:

1. Given a caustic alkali solution of aluminous material containing a small amount of gallium and of sufficiently high concentration in $Al_2O_3$ to be unstable, the method of separating and recovering the gallium content thereof which comprises first precipitating by hydrolysis and removing from the solution substantially pure aluminum hydroxid to reduce its concentration in $Al_2O_3$, partially neutralizing the solution by an acid added thereto in small increments to slowly precipitate further aluminum hydroxid, removing this second precipitate from the solution, thereafter acidifying the solution sufficiently to cause substantially all of the aluminum and gallium content remaining in the solution to precipitate together as hydroxids, removing the latter hydroxids and treating them to recover their gallium content.

2. The method of claim 1 further characterized by this: that sufficient aluminum hydroxid is removed in the first step to reduce the concentration of $Al_2O_3$ in the solution to the point where the solution is stable.

3. The method of claim 1 in which the step of partially neutralizing the solution is effected by bubbling $CO_2$ gas through the solution.

4. Given a caustic alkali solution of aluminous material containing a small amount of gallium and of sufficiently low concentration in $Al_2O_3$ to be stable, the method of separating and recovering the gallium content thereof which comprises partially neutralizing the solution by an acid added thereto in small increments to slowly precipitate substantially pure aluminum hydroxid, removing the precipitate from the solution, thereafter acidifying the solution sufficiently to cause substantially all of the remaining aluminum and gallium content to precipitate together as hydroxids, removing the latter hydroxids and treating them to recover their gallium content.

5. The method of claim 4 in which the step of partially neutralizing the solution is effected by bubbling $CO_2$ gas through the solution.

6. The recovery by the method of claim 4 of the gallium content present in the cycled liquors of the Bayer Process for the Purification of Bauxite.

7. A procedure for the recovery of the gallium content of the anodic metal produced in the electrolytic refining of aluminum, which comprises dissolving the anodic metal in a caustic alkali, removing from the solution the undissolved impurities therein, and then extracting the gallium content of the solution by the method of claim 4.

8. In a continuously operated system for the treatment of an aluminate liquor containing a small amount of $Ga_2O_3$ and of sufficiently low concentration in $Al_2O_3$ to be stable, the method of separating and recovering its gallium content according to which the liquor to be treated is delivered at one end of the system, partially carbonated at an intermediate point in the system to precipitate as hydroxids most of its aluminum content together with some of its gallium content, this precipitate removed and redissolved in the liquor entering the system, the liquor containing this redissolved precipitate treated to precipitate therefrom substantially pure aluminum hydroxid, this second precipitate removed from the system, the filtrate from this second precipitate partially carbonated at said intermediate point in the system and the precipitate so formed redissolved in the liquor entering the system, all the residual liquor left after the foregoing operations then completely carbonated to precipitate together as hydroxids its remaining aluminum content and gallium content, and the last named hydroxids removed and treated to separate and recover their gallium content.

9. The method of claim 8 in which said second precipitate is obtained by hydrolysis.

10. The method of claim 8 in which said second precipitate is obtained by treatment with $CO_2$ added in small increments.

11. The recovery by the method of claim 8 of the gallium content present in the cycled liquors of the Bayer Process for the Purification of Bauxite.

MAURICE BEJA.

REFERENCES CITED

The following references are of record in the file of this patent:

UNITED STATES PATENTS

| Number | Name | Date |
|---|---|---|
| 382,505 | Bayer | May 8, 1888 |
| 663,167 | Hall | Dec. 4, 1900 |
| 941,799 | McCulloch | Nov. 30, 1909 |
| 1,013,022 | Kendall | Dec. 26, 1911 |

OTHER REFERENCES

Mellor: "Comprehensive Treatise on Inorganic and Theoretical Chemistry," vol. 5, page 376.

Tsvetnye Metally (U. S. S. R.), 1940, No. 12, pages 60–64.

Certificate of Correction

Patent No. 2,574,008                                               November 6, 1951

MAURICE BEJA

It is hereby certified that error appears in the printed specification of the above numbered patent requiring correction as follows:

Column 3, line 31, strike out "precipitation of aluminum hydroxid. Such in-";

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*